March 11, 1969    D. L. ENSLEY    3,432,242

HIGH RESOLUTION OPTICAL PICK-OFF

Filed July 29, 1963

DONALD LUTHER ENSLEY
INVENTOR.

BY

United States Patent Office 3,432,242
Patented Mar. 11, 1969

3,432,242
HIGH RESOLUTION OPTICAL PICK-OFF
Donald Luther Ensley, Hurst, Tex., assignor, by direct and mesne assignments, to Harvest Queen Mill & Elevator Company, Dallas, Tex., a corporation of Texas
Filed July 29, 1963, Ser. No. 298,375
U.S. Cl. 356—116   5 Claims
Int. Cl. G02f 1/18; H01j 39/12

This invention relates to a system for measuring the relative rotational displacement between two bodies with reference to a common axis. In a more specific aspect, the invention relates to positional variations of wedge-shaped boundaries between right-hand and left-hand optically active glass for selective modification of a beam of polarized light.

In systems wherein measurement or detection of the rotation of one body on a given axis relative to another body on the same axis is required to be of high resolution, various types of pick-off means have been proposed. Digital pick-offs, synchronous or inductive readout devices, and the like have been provided. The present invention is directed to an optical system which overcomes difficulties encountered in prior art systems and which provides a measure of resolution considerably beyond that capable of prior art systems.

In accordance with the present invention, there is provided an optical pick-off which includes a polarized light source and a polarized light detector, both mounted on one body at positions which are on opposite sides of a second body. A pair of optically active glass elements are mounted on the second body. One of the elements is right-hand and the other of the elements is left-hand. The elements have a common boundary which lies in a plane which makes a very small angle with respect to the light path between the source and detector. The elements are supported on the second of the bodies for movement upon rotation of the body relative to the light beam whereby the light beam passes through lengths of right-hand glass and left-hand glass which vary complementarily upon rotation of the second body. This produces a sinusoidal voltage output from the detector which varies in dependence upon the rotation of the angle between the plane of the boundary and the light path, and upon the radius from the center of rotation of the light path.

Figure 1:
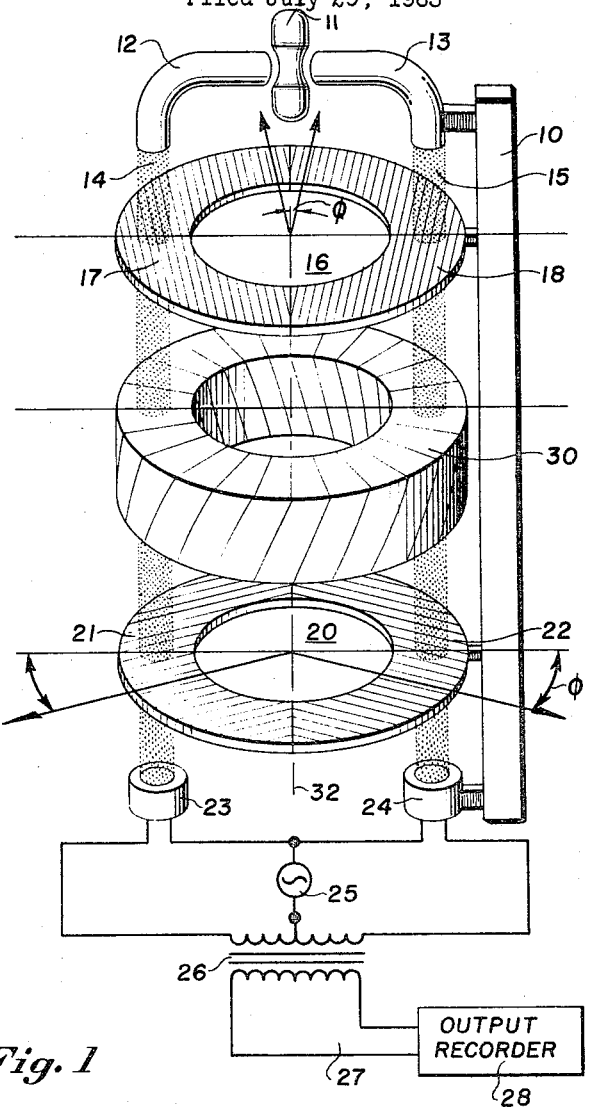
Figure 2:
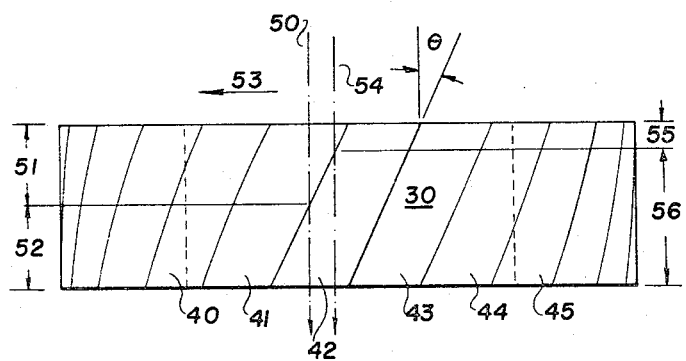

For a more complete understanding of the present invention and for further objects and advantages thereof, reference may now be had to the following description taken in conjunction with the accompanying drawings in which:

FIGURE 1 is a diagrammatic representation of one embodiment of the present invention; and FIGURE 2 is an enlarged side view of the optically active cylinder of FIGURE 1.

Referring now to FIGURE 1, there is illustrated an optical pick-off system in which a plate 10 is provided for the support of portions of an optical system which is fixed in position. Supported from plate 10 (by means not shown) is a light source 11 and a light pipe 12. A second light pipe 13 is supported on plate 10. Light from the source 11 is directed through the pipes 12 and 13 into the form of relatively small beams 14 and 15, respectively. A two-piece polarizing disk 16, formed by a half-disk 17 and a second half-disk 18, is supported on the plate 10 adjacent to the ends of the light pipes 12 and 13. A second two-piece polarizing disk 20, including half-disk 21 and half-disk 22, is supported by plate 10 at a point spaced from plate 16. A pair of light detectors 23 and 24 are provided adjacent to the disk 20 and are supported by plate 10 to intercept the beams of light 14 and 15, respectively. The photocells 23 and 24 are connected to a voltage source 25 and to an output transformer 26 as to be in phase-opposition. So long as the beams on cells 23 and 24 are of equal intensity, the voltage in the output circuit 27, and as applied to an output recording or measuring system 28, is null. However, when the intensities of light on photocells 23 and 24 differ, an error voltage will appear in the output circuit 27.

A second body including ring 30 is mounted for rotation (by means not shown) on axis 32. The ring 30 may thus be caused to rotate relative to the plate 10. The ring 30 is in the form of a short cylinder.

The ring 30 is formed as best seen in FIGURE 2. It is a composite cylinder made up of an optically active glass or transparent material. It may be visualized as having been formed from two like cylinders, each of which is sliced into trapezoidal-shaped truncated pie sections. One of the two cylinders is of optically active glass such as laevorotatory, or left-hand quartz. The other cylinder may be dextrorotatory, or right-hand quartz. From the left-hand and right-hand sections, a composite cylinder is formed by making alternate sections 40, 42, 44, etc. of right-hand glass, and intermediate sections 41, 43, 45, etc. of left-hand glass. The slices are formed such that the angle $\theta$ is relatively small. The angle $\theta$ is shown very large for purposes of illustration. In practice, it will be of the order of only a few degrees or less, depending upon the resolution required.

When a beam of light is directed through the ring 30 as along the line 50, it passes through a length of left-hand glass in the segment 41 equal to the length 51. It passes through right-hand glass in the section 42 equal to the length 52. However, if the ring 30 is rotated in the direction of arrow 53 through a slight angle as to be at the position of line 54, the length of element 41 traversed by the beam is then reduced to the length 55, whereas the length traversed by the beam through the section 42 is the much greater length 56. By making the angle $\theta$ very small and utilizing a great number of slices to make up the composite ring 30, an extremely high sensitivity is achieved in measurement of angular rotation.

In the system illustrated in FIGURE 1, a pair of cylindrical light beams are employed together with two-piece polarizing plates 16 and 20, in which the optical axes of the plates 17 and 18 are separated by an angle $2\theta$. The plates 21 and 22 of the polarizing plate 20 are separated by an angle equal to $180° - 2\theta$. When ring 30 is not present, the light beam is completely shut off by the polarizing shutter and the illumination of the cells 23 and 24 is zero. However, when ring 30 rotates in the light path relative to the plate 10, the light transmitted to the cells 23 and 24 varies sinusoidally as the difference between the effective lengths of right-hand and left-hand glass is varied by rotation of the ring 30. The system 28 is responsive to the pulses that appear in the output of the system. It may be in digital form or may include counter means so that the rotation of the ring 30 will be directly proportional to the number of pulses applied to the output system 28. Preferably, the length of the ring or cylinder 30 will be substantially equal to the circumferential length of a given segment divided by the tangent of the angle between the sloping surface of the ring segment and the axis of the ring.

While a two-beam system has been illustrated in FIGURE 1, it will be readily apparent that a multiplicity of detectors and a multiplicity of light beams may be employed. A slotted light source may be employed to provide an array of narrow beams of light around the axis 32. Such beams may be employed with a like plurality of detectors, ring segments, and with output counting logic built into unit 28 so that the sensitivity of the system will be multiplied in proportion to the number of units employed.

The ring 30 may be formed from right-hand and left-hand quartz. It may be formed from tourmaline or from Rochelle salt or other materials which have right-hand and left-hand species. The optical gain of the pick-off system is proportional to the angle $\theta$ of FIGURE 2. It is also dependent upon the number of the detectors employed and dependent upon the radius at which the light beams are located.

Thus in accordance with the present invention, there is provided an optical pick-off in which the light source 11, 12, 13 is employed to produce beams of light which pass through a polarizing light shutter along light paths between the source and detectors 23 and 24. At least two optically active glass plates are provided, one of which is right-hand glass and the other of which is left-hand glass. They are mounted as to have a common boundary which lies in a plane tilted at a small angle with repsect to the direction of the light beam. The glass sections thus oriented are mounted for rotation relative to the light beam on an axis which is parallel to the direction of the light beams for varying the length of the path of the light beam within right-hand and left-hand glass as the glass elements are rotated through the light beam.

Having described the invention in connection with certain specific embodiments thereof, it is to be understood that further modifications may now suggest themselves to those skilled in the art, and it is intended to cover such modifications as wall within the scope of the appended claims.

What is claimed is:

1. Means for measurement of relative rotation between two bodies wherein a polarized light source and a polarized light detector are spaced apart on a first body at a predetermined distance from the axis of rotation of a second body, the combination which comprises:
   (a) an optically active ring of alternate sections of dextrorotatory material and laevorotatory material having a plurality of radial boundaries which lie in planes passing through the length of said ring and are tilted at acute angles with respect to a line extending between said source and said detector, and
   (b) means for supporting said ring on said second body for rotary movement about the axis through the path of the light beam whereby said light beam traverses different lengths of dextrorotatory and laevorotatory material to vary the light reaching said detector.

2. An optical rotational pick-off for measurement of relative rotation between two bodies on a common axis which comprises:
   (a) a light source and a light detector mounted on a first of said bodies each adjacent to a different end of the second of said bodies and at a predetermined radius from said axis,
   (b) a pair of crossed polarizing light shutter means spaced apart in the light path between said source and said detector,
   (c) an optically active ring of light transmitting elements disposed between said light shutter means, said elements alternately being of dextrorotary and laevorotary material and having radial intersecting surfaces which are disposed at an acute angle with respect to said path, and
   (d) means for supporting said ring on said second body at said radius for movement through the path of the light beam whereby said beam traverses different lengths of dextrorotatory and laevorotatory material dependent upon rotation of said first body relative to said second body to produce a sinusoidal voltage output function from said detector.

3. In an optical pick-off system which detects variations in light passing through an element, the element comprising:
   a cylinder formed from a plurality of similarly shaped sections of dextrorotatory optical elements and laevorotatory optical elements alternately disposed around the cylinder axis to have common boundaries defined by spaced apart cylinder radial lines and by intersection lines about the outer side surface of said cylinder each intersection line tilted at an acute angle with respect to the axis of said cylinder.

4. The combination set forth in claim 3 wherein said optical elements comprise glass.

5. The combination set forth in claim 3 in which the length of said cylinder is substantially equal to the circumferential length of a given segment divided by the tangent of said acute angle.

References Cited

UNITED STATES PATENTS 3,205,364   9/1965   Pong.

OTHER REFERENCES

Meltzer, R. J., Magneto Optic Positioning, IEE Transactions on Ind. Electronics, vol. 1E10, No. 1, May 1963, pp. 46–56.

Jenkins et al., Fundamentals of Optics, Third Edition, N.Y., 1957, pp. 598–599.

JEWELL H. PEDERSEN, Primary Examiner.

A. A. KASHINSKI, Assistant Examiner.

U.S. Cl. X.R.

250—225; 350—157